(12) United States Patent
Sugimoto et al.

(10) Patent No.: US 8,437,309 B2
(45) Date of Patent: May 7, 2013

(54) MULTIHOME SUPPORT METHOD AND APPARATUS

(75) Inventors: Shinta Sugimoto, Kanagawa (JP); Ryoji Kato, Kanagawa (JP); Toshikane Oda, Tokyo (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 404 days.

(21) Appl. No.: 12/739,832

(22) PCT Filed: Oct. 26, 2007

(86) PCT No.: PCT/EP2007/061523
§ 371 (c)(1),
(2), (4) Date: Apr. 26, 2010

(87) PCT Pub. No.: WO2009/052867
PCT Pub. Date: Apr. 30, 2009

(65) Prior Publication Data
US 2010/0260123 A1   Oct. 14, 2010

(51) Int. Cl.
*H04W 36/00* (2009.01)
(52) U.S. Cl.
USPC .......................... 370/331; 455/436
(58) Field of Classification Search ................ None
See application file for complete search history.

(56) References Cited

U.S. PATENT DOCUMENTS

2010/0054135 A1 * 3/2010 Rahman et al. ............... 370/242
2010/0272061 A1 * 10/2010 Muhanna et al. ............. 370/331
2011/0299477 A1 * 12/2011 Nikander et al. ............. 370/329

OTHER PUBLICATIONS

Bagnulo Huawei Lab At UC3M M: "Proxy Shim6 (P-Shim6); draft-bagnulo-pshim6-01.txt" IETF Standard-Working-Draft, Internet Engineering Task Force, IETF, CH, No. 1, Mar. 4, 2007, XP015048781 ISSN: 0000-0004 p. 1, paragraph 1.1, p. 14, paragraph 6.1.2, p. 15, paragraph 6.1.3, p. 20.

* cited by examiner

*Primary Examiner* — Robert Scheibel (57) ABSTRACT

A method of facilitating multihoming in the case of a mobile node possessing an Upper Layer Identifier belonging to a home network, where the mobile node is assigned a Global Mobility Management anchor within the home network and a Local Mobility Management anchor within a visited network. The method comprises allocating to the mobile node a primary SHIM6 proxy at said Global Mobility Management anchor, and at least one secondary SHIM6 proxy at said Local Mobility Management anchor. At said primary SHIM6 proxy, a SHIM6 context is established on behalf of the mobile node in respect of a peer node; and the established context is shared with said secondary SHIM6 proxy. Locator switching is then performed in respect of traffic exchanged between the mobile node and said peer node at one of said primary and secondary SHIM6 proxies.

18 Claims, 7 Drawing Sheets

MULTIHOME SUPPORT METHOD AND APPARATUS

TECHNICAL FIELD

The present invention relates to a method and apparatus for providing multihome support for mobile nodes. The invention relates in particular to the use of the Layer 3 Shim for IPv6 (SHIM6) to provide such multihome support.

BACKGROUND

"Multihoming" is a term used to describe the provision of multiple direct or indirect IP interfaces to a single mobile node such that the mobile node is able to send and/or receive data via any one of the interfaces. Consider for example a wireless mobile terminal belonging to a user have a subscription with a home Public Land Mobile Network (PLMN). The terminal may be allocated a fixed IP address by the home network, i.e. a Global Home Address (GHoA). When the terminal is attached to the home PLMN it is directly reachable at the GHoA. However, when the terminal is attached to a visited PLMN, the terminal will be allocated a local IP address by the visited PLMN, termed a Local Home Address (LHoA). Moreover, it is possible that the terminal may be allocated multiple GHoAs/LHoAs within the home and visited PLMNs to provide a degree of redundancy.

A mobile node can benefit from using different IP address for different purposes. However, it can be an excessive operational burden for the mobile node itself to handle IP address selection and management. First of all, the mobile node may not have knowledge of the different characteristics of different IP addresses. For example, the mobile node may be unaware that the use of a GHoA will result in tunneling of an entire traffic flow through a Global Mobility Management (GMM) Anchor in the home network, whereas the use of a LHoA will result in tunneling of the entire traffic flow through a Local Mobility Management (LMM) Anchor in the visited network. Secondly, using different IP addresses for the same communication session is not ideal from the perspective of upper layer protocols. Normally, upper layer protocols cannot change the endpoints of a communication during the lifetime of a session. Thirdly, a peer node with which a mobile node is communicating may be confused by the use of multiple IP addresses associated with a single mobile node. Whilst the peer node may be able to learn and associate the multiple IP addresses (e.g. via a DNS lookup), the peer cannot necessarily choose the correct IP address to use in a given circumstance.

Figure 1:
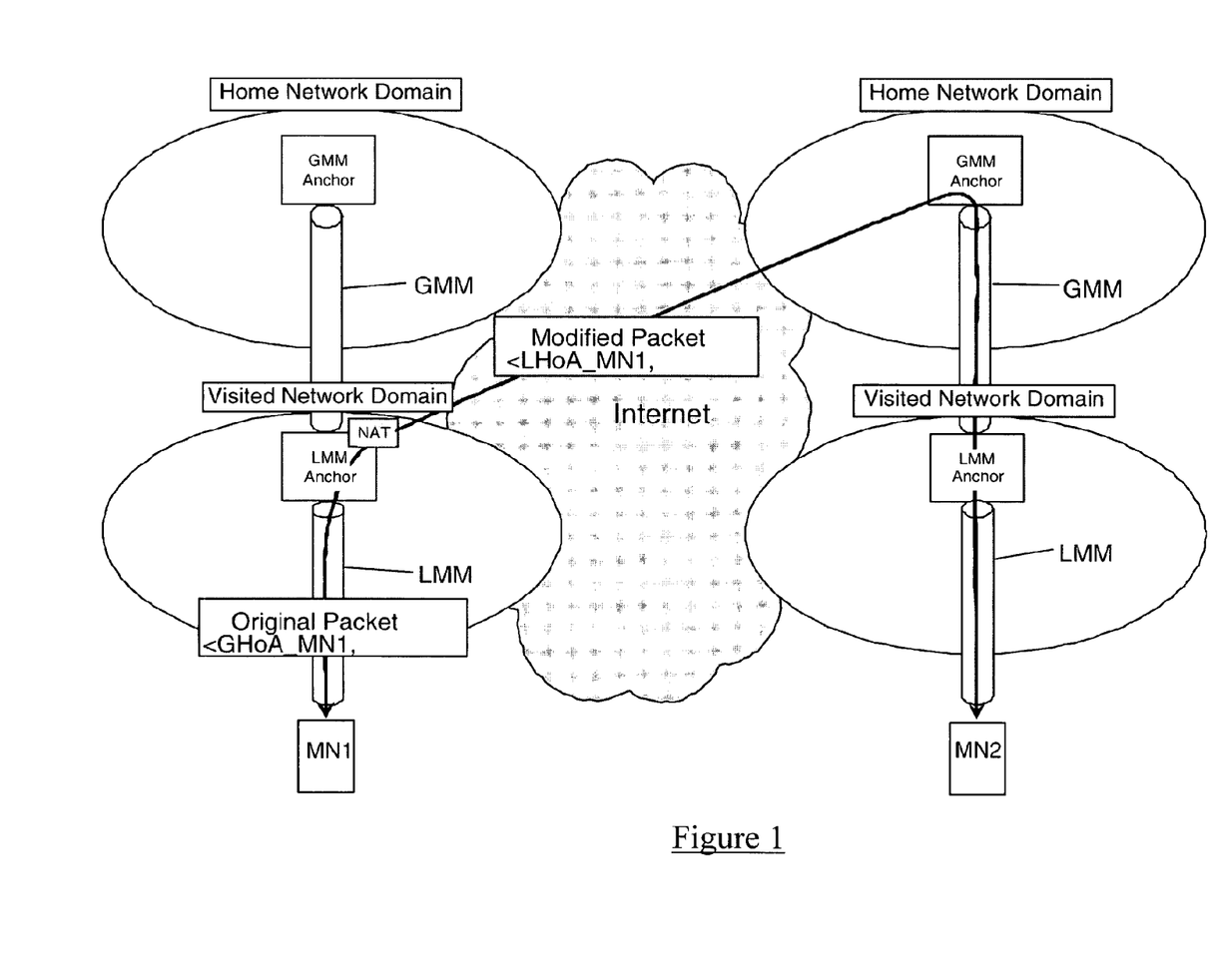
FIG. 1 illustrates a prior art NAT based approach to providing multihoming for a mobile node.

A solution to the multihoming problem and which avoids the need to place additional operational requirements on the mobile node involves the use of a Network Address Translator (NAT). This approach is illustrated in FIG. 1 for the case where two communicating mobile nodes, MN1 and MN2, are attached to respective visited networks. A NAT is located within MN1's visited network, co-located with the LMM anchor, and performs address translation based upon a mapping between the GHoA and LHoA of MN1. In this way, a mobile node can continue using a single IP address for all communications while a communication can be locally broken out according to the policies of the network operator.

The NAT-based solution has its problems however. Firstly, the end-to-end nature of the Internet is broken as the NAT rewrites the IP source and/or destination IP address. This means that the communicating peers cannot utilise end-to-end security mechanism such as IPsec. Secondly, address translation (on behalf of the mobile node behind the NAT) can only be made at the initiator side and therefore the routing path cannot be fully optimised. Thirdly, it is impossible to change the Locator (i.e. the IP address used to direct traffic to the NAT) during a session lifetime because the "stateful" information is solely maintained by the NAT device. The communication is broken if the initiator changes the LMM anchor. This is important as it effectively prevents the initiator (MN1) from roaming to another LMM anchor, for example within a new access network, whilst maintaining an ongoing session. Thus, mobility protocols such as Mobile IP cannot be used efficiently with the NAT-based approach to multihoming.

Layer 3 Shim for IPv6 (SHIM6) [E. Nordmark and M. Bagnulo, "Shim6: Level 3 Multihoming Shim Protocol for IPv6," draft-ietf-shim6-proto-08.txt, work-in-progress] is a protocol which aims to facilitate multihoming of fixed nodes by adding an additional layer in the protocol stack at the host, below the transport layers. The SHIM6 layer performs a translation between an Upper Layer Identifier (ULID) which serves as a permanent communication endpoint for a node and one or more Locators which represent the topological point(s) of attachment of the node. A fourway handshake is conducted between nodes prior to employing SHIM6 in order to create a shared SHIM6 context. This context defines for both nodes the ULID-to-Locator mappings. In the event that ULIDs of both nodes represent the optimal routing path between the nodes, packets may pass transparently through the SHIM6 layers at both endpoints. However, if that is not the case (or a link fails) the SHIM6 layer at the sending node can replace the ULID for one or both of the source and destination IP addresses with one of the corresponding Locators.

A SHIM6 proxy has been proposed [M. Bagnulo, draft-bagnulo-pshim6-01, "Proxy Shim6(P-Shim6)," work-in-progress] which shifts the SHIM6 layer to a network based entity. As such, the SHIM6 proxy is responsible for establishing and maintaining a SHIM6 context with a peer node or other SHIM6 proxy. Considering again FIG. 1, one can consider replacing the NAT device in the visited PLMN with a SHIM6 proxy. The proxy would be aware of the multiple interfaces available to the peer node, MN2, and could direct traffic either to the GMM anchor of MN2 or directly to its LMM anchor. The use of a SHIM6 proxy allows route optimisation to be carried out on either side of the communication path, as the SHIM6 context is shared by both ends. This is in contrast to the NAT approach where mapping information is not shared.

SUMMARY

Whilst SHIM6 does provide a mechanism for route optimisation in the case of fixed mobile nodes, it does not by itself solve the problem of implementing multihoming in the case of mobile nodes.

According to a first aspect of the present invention there is provided a method of facilitating multihoming in the case of a mobile node possessing an Upper Layer Identifier, typically an IP address, belonging to a home network, where the mobile node is assigned a Global Mobility Management anchor within the home network and a Local Mobility Management anchor within a visited network. The method comprises allocating to the mobile node a primary SHIM6 proxy at said Global Mobility Management anchor, and at least one secondary SHIM6 proxy at said Local Mobility Management anchor. Typically, the primary proxy discovers the secondary proxy(ies) as a result of appropriate flags set within proxy binding updates. At said primary SHIM6 proxy, a SHIM6 context is established on behalf of the mobile node in respect of a peer node. The context is then shared said secondary SHIM6 proxy. Locator switching in respect of traffic exchanged between the mobile node and said peer node is then carried out at one of said primary and secondary SHIM6 proxies.

Route optimisation can be performed at the secondary proxy, or at the primary proxy if traffic flows are sent by the secondary proxy to the primary proxy. Thus, even if a link fails at a secondary proxy, route optimisation can be implemented at a higher level secondary proxy or even at the primary proxy. Furthermore, it is possible for an existing context to be supplied to a new secondary proxy in the event of a handover of the mobile node to a new visited network and/or access router.

The establishment of a SHIM6 proxy group, and the transfer of contexts between proxies, can be achieved using a modified, existing mobility management protocol, such as Mobile IP, or using the SHIM6 protocol itself.

According to a second aspect of the present invention there is provided apparatus configured to implement mobility management within a home network on behalf of a mobile terminal belonging to the home network. The apparatus comprises means for implementing a primary SHIM6 proxy on behalf of said mobile device, means for establishing a SHIM6 context on behalf of the mobile node in respect of a peer node, and means for sharing the established context with one or more secondary SHIM6 proxies within a visited network to which said mobile node is attached.

It will be appreciated that the various means may be implemented using suitable software operating on a computer system. Alternatively of course the means may be implemented by way of hardware only.

According to a third aspect of the present invention there is provided apparatus configured to implement mobility management within a visited network on behalf of a mobile node attached to the visited network. The apparatus comprises means for implementing a secondary SHIM6 proxy on behalf of said mobile device, means for receiving from a primary SHIM6 proxy within a home network of the mobile node a context established by the primary SHIM6 proxy in respect of a peer node, means for installing the received context within a context database, and means for performing locator switching in respect of traffic exchanged between the mobile node and said peer node on the basis of said context.

DETAILED DESCRIPTION

In order to allow mobile networks to benefit from multihoming it is proposed here to introduce an architecture consisting of a group of SHIM6 Proxies (SHIM6 Proxy Group) working cooperatively to maintain a SHIM6 context for a given mobile node. This is in contrast to the prior art proposals where a single SHIM6 proxy is solely responsible for maintaining the SHIM6 context for a host.

Within a SHIM6 Proxy Group, a hierarchy is created; the SHIM6 proxy inside the GMM Anchor is called the Primary SHIM6 proxy and the others are called the Secondary SHIM6 Proxies. The Primary SHIM6 proxy must be located in the network where the GHoA (which will be used as the ULID in the context of SHIM6) of the mobile node is owned. In a roaming scenario, a Secondary SHIM6 proxy may reside in the visited network. If an Access Router of the mobile node supports LMM (e.g. Proxy Mobile IPv6), it is also possible that the Access Router accommodates a Secondary SHIM6 proxy. The Primary SHIM6 proxy is responsible for establishing a SHIM6 context and maintaining the mapping of ULID(s) and locators of a mobile node. A Secondary SHIM6 proxy is responsible for executing locator switching according to the SHIM6 context provided to it by the Primary SHIM6 proxy as will be described below.

Once a SHIM6 context has been established for a mobile node by the Primary SHIM6 proxy, a copy of the context is distributed to the Secondary SHIM6 proxy (or proxies) within the Proxy Group. The copy is transported either by the mobility protocol that runs between the mobility anchors or access router, or by the SHIM6 protocol itself. A SHIM6 proxy has an interface to the mobility management functional component and exchanges information as necessary (e.g. SHIM6 context, IP addresses, filter rules etc.).

As has already been discussed, locator switching is a procedure to rewrite source and/or destination IP addresses in an IPv6 packet according to a SHIM6 context. In the architectures described here, locator switching is executed by one of the secondary SHIM6 proxies (assuming such are present). If no Secondary SHIM6 proxy exists (e.g. in the case of a mobile node visiting its home network), the Primary SHIM6 proxy may execute locator switching. In any case, it is advantageous to execute locator switching at the SHIM6 proxy that is closest to the mobile node. Nonetheless, it is important to note that each of the SHIM6 proxies within a Proxy Group is responsible for monitoring the availability of IP addresses assigned to a given mobile node by the network within which the proxy is located. In other words, all SHIM6 Proxies should perform reachability tests of any locator pair in which an IP address derived from network domain is included. The procedure of reachability test shall be done as specified in J. Arkko and I. V. Beijnum, "Failure Detection and Locator Pair Exploration Protocol for IPv6 Multihoming," draft-ietf-shim6-failure-detection-08, work-in-progress. If a given locator pair turns out to be unreachable, the SHIM6 proxy that detects the problem shall inform the other SHIM6 proxies within the Proxy Group.

Figure 2:
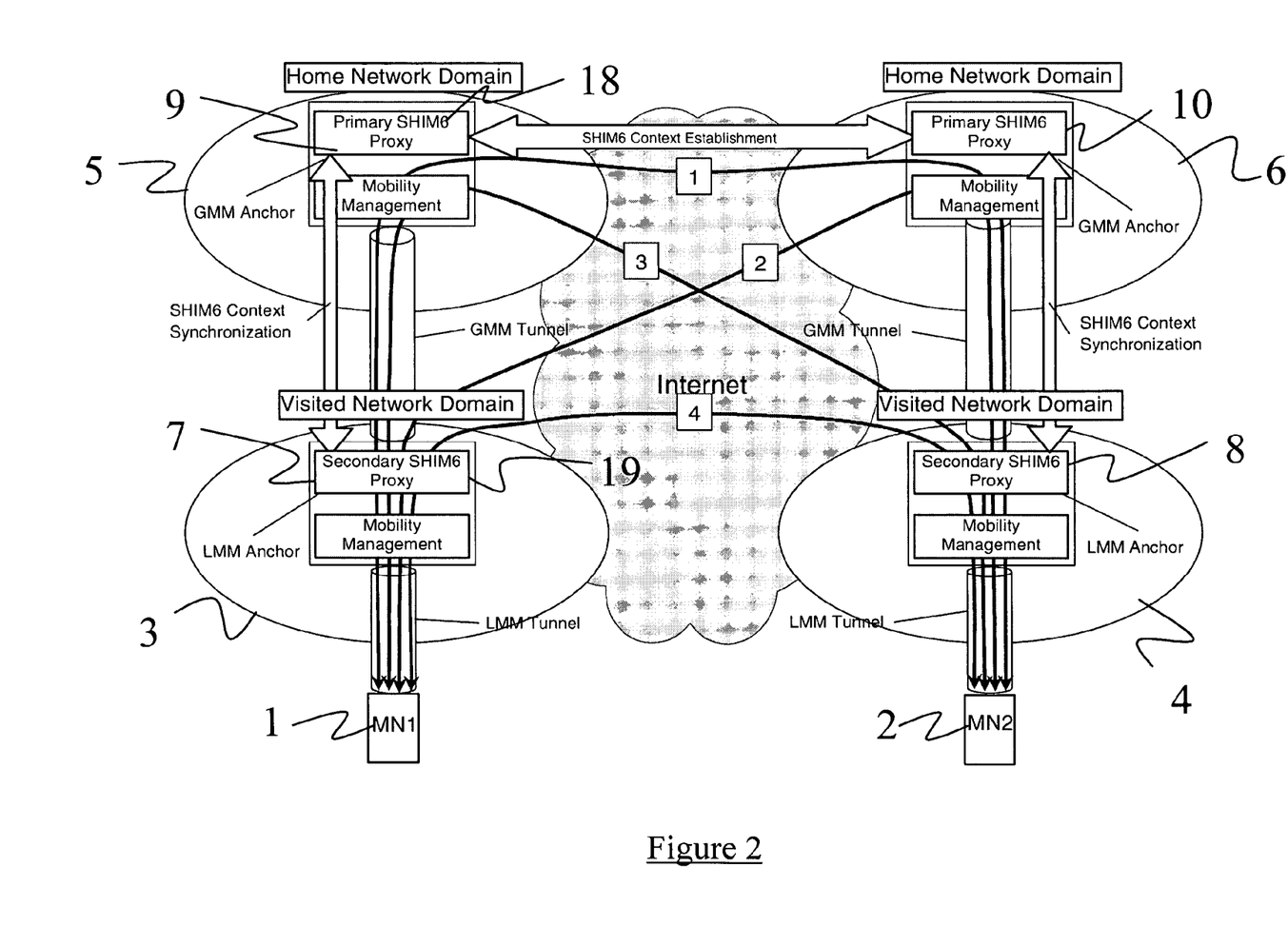
FIG. 2 illustrates a hierarchical SHIM6 proxy approach to providing multihoming.

FIG. 2 presents an overview of how the hierarchical approach operates across a network. The illustrated scenario involves a pair of roaming mobile nodes 1,2 communicating with one another via respective visited networks 3,4. Each mobile node will have obtained a global home address (GHoA) from its home network domain 5,6. The GHoA is topologically derived from the home network, and a mobile node configures the GHoA on its interface. Since the GHoA is the only IP address that the mobile node is aware of, it is used for all of its communications. In a visited network domain, each mobile node also acquires a local home address (LHoA). In contrast to the GHoA, a LHoA is never assigned physically to a mobile node but is handled by the LMM Anchor 7,8 as a dedicated address for the mobile node.

For each mobile node, a SHIM6 Proxy Group is formulated by the entities inside the network. The Primary SHIM6 proxy 18 inside the GMM Anchor 9,10 in the home network and the Secondary SHIM6 proxy 19 inside the LMM Anchor start to provide SHIM6 multihoming support for the mobile node. In an initial stage, ULID and associated locators are determined by the SHIM6 Proxy Group.

Figure 3:
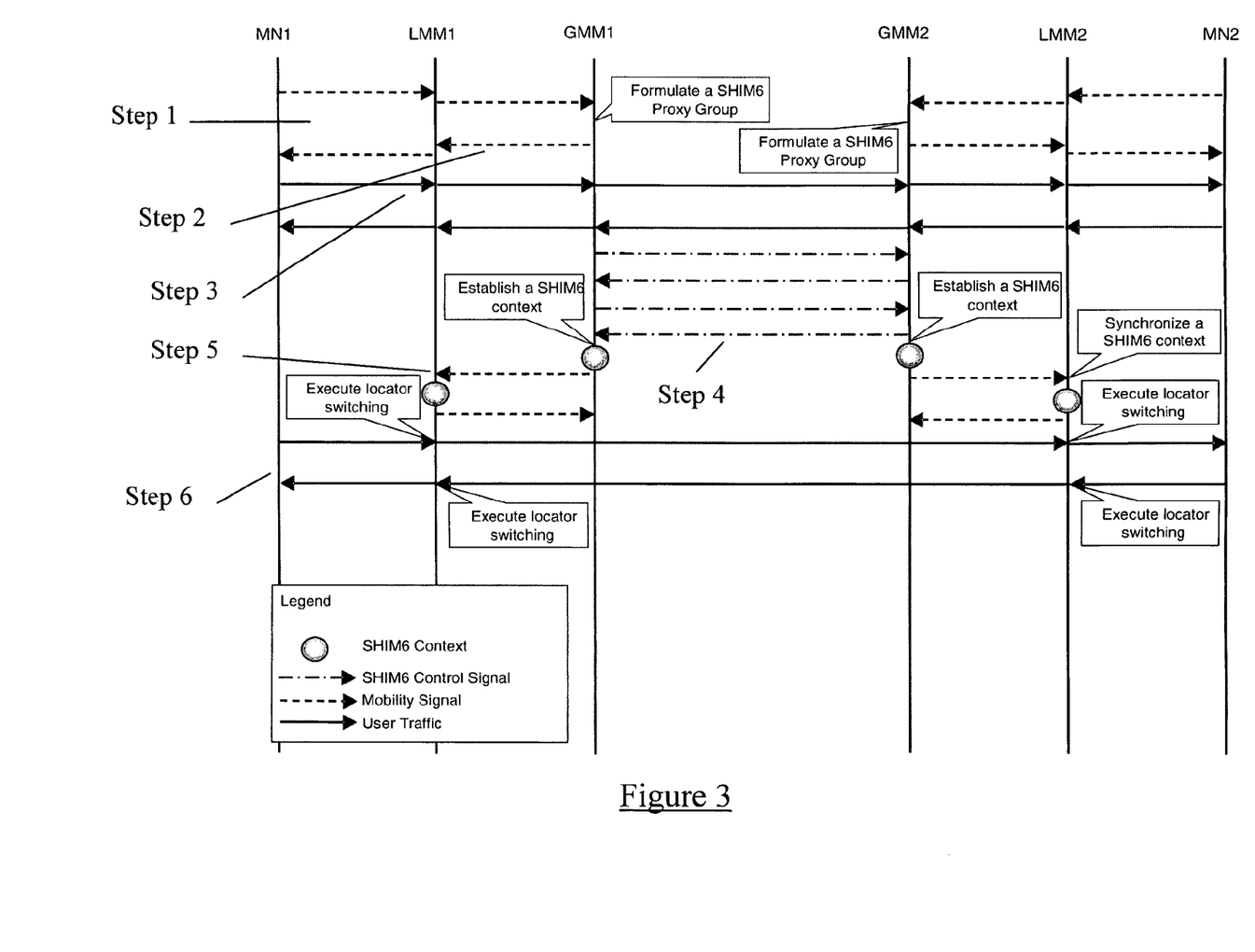
FIG. 3 illustrates a signalling flow associated with SHIM6 context establishment and subsequent locator switching in the architecture of FIG. 2.

FIG. 3 illustrates a signalling flow associated with establishing a SHIM6 Proxy Group within the architecture of FIG. 2. In this case, a proxy group is established for both MN1 and MN2 (step 1). The GMM anchor providing the Primary SHIM6 proxy may learn of the Secondary proxies by way of an additional flag contained within proxy binding update messages sent from the LMM to the GMM as part of a mobility protocol. An exchange (step 2) is then conducted between the GMM and the LMM in order to share the Locators available (at each of the anchors) to the mobile node. Thereafter, a flow of user traffic between the mobile nodes is initiated (step 3), triggering the establishment of a SHIM6 context (step 4) between the primary SHIM6 proxies on behalf of the mobile nodes according to the SHIM6 base specification (i.e. involving the four message exchange). The standard security mechanism is applied to the context establishment, i.e., the Primary SHIM6 proxy appends a cryptographically generated address (CGA) signature to the SHIM6 control message registering the mapping of a ULID and locators. It is assumed that the GMM Anchor has access to the Parameters Data Structure (PDS) which is associated with the CGA (GHoA) assigned to the mobile node.

Once the SHIM6 context has been successfully established, a copy of the context is distributed to the Secondary SHIM6 Proxies (LMM) on either side (step 5), so that the Secondary proxies can execute locator switching (step 6) within the respective visited networks. Thanks to the locator switching, the route path between the mobile nodes can be optimised. The arrows labelled with numbers from 1 to 4 in FIG. 2 indicate possible routing paths between the mobile nodes.

Considering further the synchronisation of the SHIM6 context across the Proxy Group, the transportation of the SHIM6 context is done either by the extension of the SHIM6 protocol or by the extension to the IP mobility management protocol which runs between the SHIM6 proxies involved in the SHIM6 context synchronisation. In the former approach, new SHIM6 control messages are defined. In either case, a copied SHIM6 context should include at least the following information:

Context Tag (local)
Context Tag (remote)
Preferred locator (local)
Preferred locator (remote)
Locator list (local)
Locator list (remote)
Flow Information (a 5 tuple vector which is useful for identifying the packet flow).

A Secondary SHIM6 proxy which receives the above information updates its SHIM6 context database. The flow information is then used to selectively apply locator switching to a packet flow.

Figure 4:
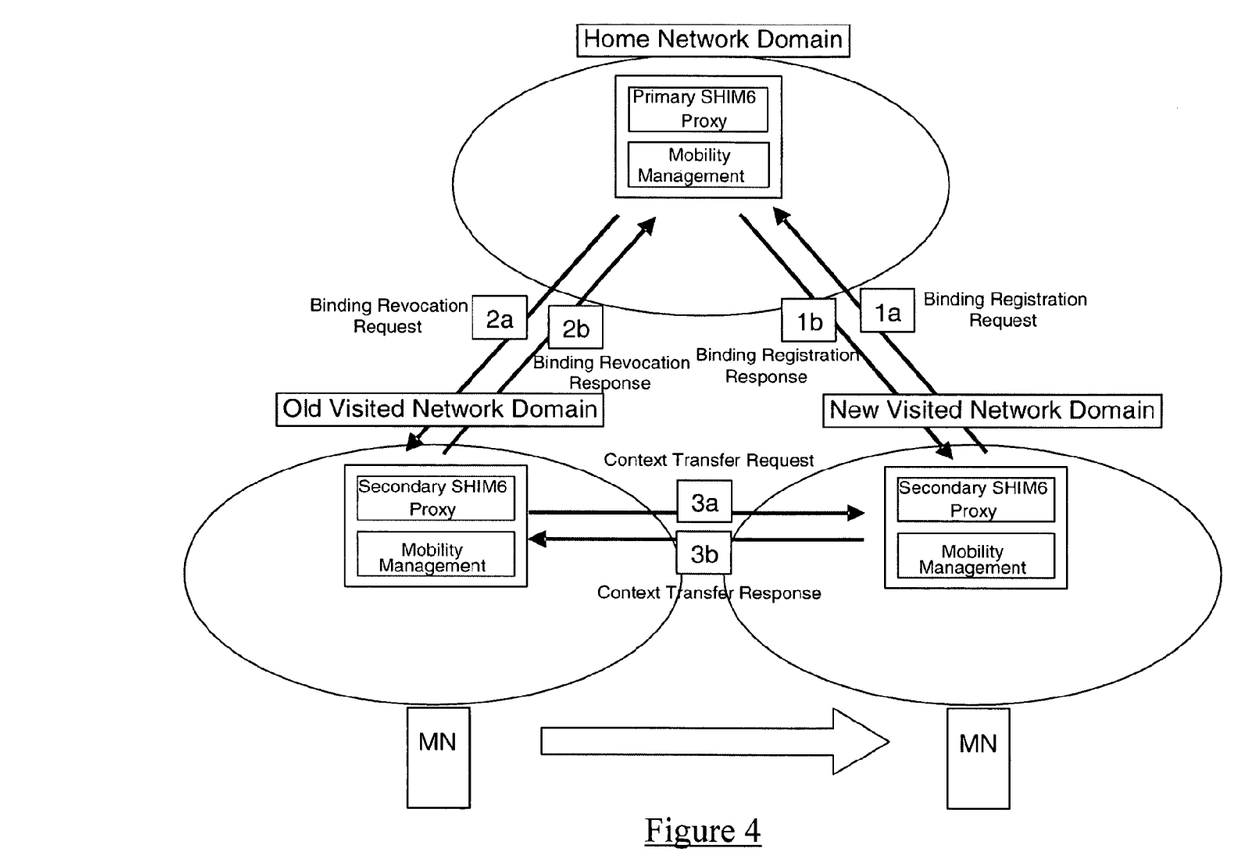
FIG. 4 illustrates schematically a context transfer associated with a handover of a mobile node between Local Mobility Management anchors.

In order to handle mobility, it is proposed to enable the sharing of SHIM6 contexts between Secondary SHIM 6 proxies either directly or via the Primary proxy. FIG. 4 illustrates a scenario where a mobile node is handed over from a first ("old") visited network to a second ("new") visited network, i.e. changing its LMM anchor. The GMM Anchor learns of the handover by means of mobility related signalling, that is a Binding Registration Request received from the new LMM Anchor. This request is acknowledged, and a Binding Revocation Request sent by the GMM Anchor to the old LMM Anchor. At this point, the Primary SHIM6 proxy may send a SHIM6 Locator Update message to the correspondent SHIM6 proxy (or MN if no proxy exists for the correspondent node) to update the list of local locators. This procedure is efficient for minimizing the packet loss which could be caused by the remote SHIM6 proxy (or MN) continuing to send IP packets to the invalid (old) remote locator. Meanwhile, until the list of local locators is updated, all incoming traffic is forwarded by the GMM Anchor to the invalid (old) locator.

Three approaches to sharing the SHIM6 context are considered here.

According to a first approach, the Primary SHIM6 proxy proactively pushes one or more SHIM6 contexts for the mobile node in question to the new Secondary SHIM6 proxy. The Primary SHIM6 Proxy makes appropriate modifications to the locator list of the mobile node, i.e. replacing the locators derived from the old visited network domain with the new locators. The context maintained by the old Secondary SHIM6 proxy should be torn down upon the receipt of the Binding Revocation Request sent by the Primary SHIM6 proxy.

In a second approach, the old Secondary SHIM6 proxy directly transfers the SHIM6 context to the new Secondary SHIM6 proxy, using a context transfer mechanism such as the Context Transfer Protocol (CXTP) [J. Loughney, M. Nakhjiri, C. Perkins, and R. Koodli, "Context Transfer Protocol (CXTP)," RFC 4067, July 2005]. Thus this approach is only available when the used mobility protocol supports a context transfer mechanism. The old Secondary SHIM6 proxy trims the list of local locators within the SHIM6 context, i.e. removing the locators that are derived from the old visited network domain. If the context transfer is successful, the old Secondary SHIM6 proxy shall tear down the context, whilst the new Secondary SHIM6 proxy shall update the list of locators by adding new locators that are available in the new visited network.

According to a third approach, the old Secondary SHIM6 proxy transfers the SHIM6 context of the mobile node to the Primary SHIM6 proxy. However, invalid (old) locator(s) is/are excluded from the locator list by the old Secondary SHIM6 proxy. Accordingly the Primary SHIM6 Proxy transfers the SHIM6 context to the new Secondary SHIM6 Proxy. Thus this is a combination of the first and second approach. The old Secondary SHIM6 Proxy trims the list of local locators.

Figure 5:
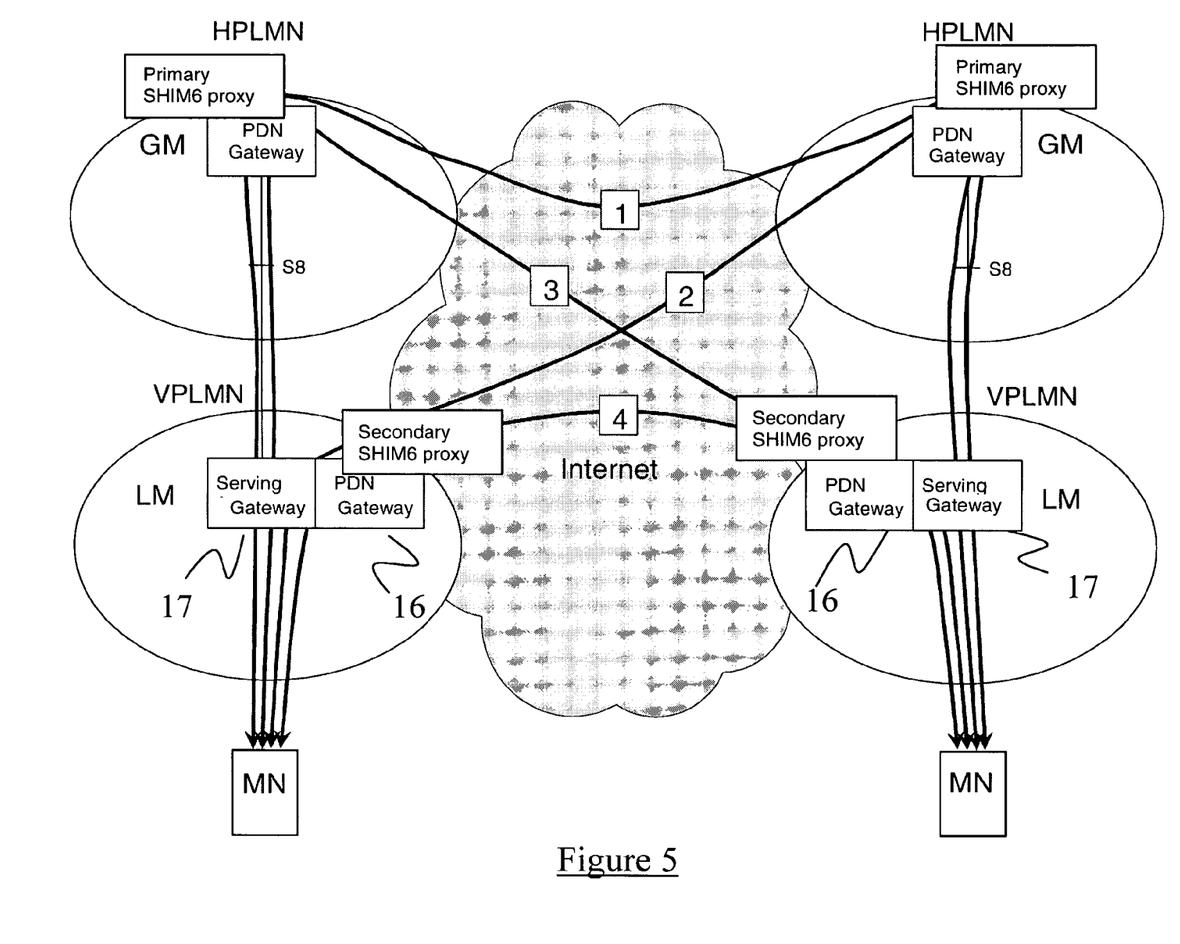
FIG. 5 illustrates schematically implementation of a hierarchical SHIM6 architecture with a 3GPP SAE network.

In order to further illustrate the inventive principles, reference is made to FIG. 5 which illustrates their applicability to the proposed 3GPP System Architecture Evolution (SAE). The entities illustrated are related to IP mobility management, namely the PDN SAE Gateway 16 and the Serving SAE Gateway 17. As shown in the Figure, each mobile node is served by a home network operator and is connected to a visited network that has a roaming agreement with the home network operator. On each side, the PDN SAE Gateway in the HPLMN serves as a GMM Anchor, and the PDN SAE Gateway co-located with the Serving SAE Gateway serves as a LMM Anchor for the mobile node.

It is possible that one or both of the mobile nodes acquires two IP addresses, namely a GHoA in its HPLMN and a LHoA in the VPLMN. Each HoA is topologically situated at a respective PDN SAE Gateway. It is also possible that a PDN SAE Gateway has multiple connections (SGi interfaces) to its PDN. Such operation increases the reliability of the network, since the connection to the PDN at the home network can be a single point of failure. In order to achieve efficient use of the IP addresses assigned to a mobile node, a SHIM6 Proxy is placed within each Mobility Anchor, i.e., the PDN SAE Gateway in the HPLMN accommodates a Primary SHIM6 Proxy and the PDN SAE Gateway in the VPLMN accommodates a Secondary SHIM6 Proxy. The mobility protocol that runs between the GMM Anchor and LMM Anchor could be either GPRS Tunnelling Protocol (GTP) or Proxy Mobile IPv6 and those protocols can be enhanced to support required extensions.

The session between the two illustrated mobile nodes, a SHIM6 context is established and maintained by the Primary SHIM6 Proxy inside the PDN SAE Gateway. The Secondary SHIM6 Proxy in VPLMN performs locator switching based on the SHIM6 context provided by the Primary SHIM6 Proxy. As shown in the Figure, locator switching enables various optimised routing paths (1 to 4) to be selected between the two mobile nodes.

Figure 6:
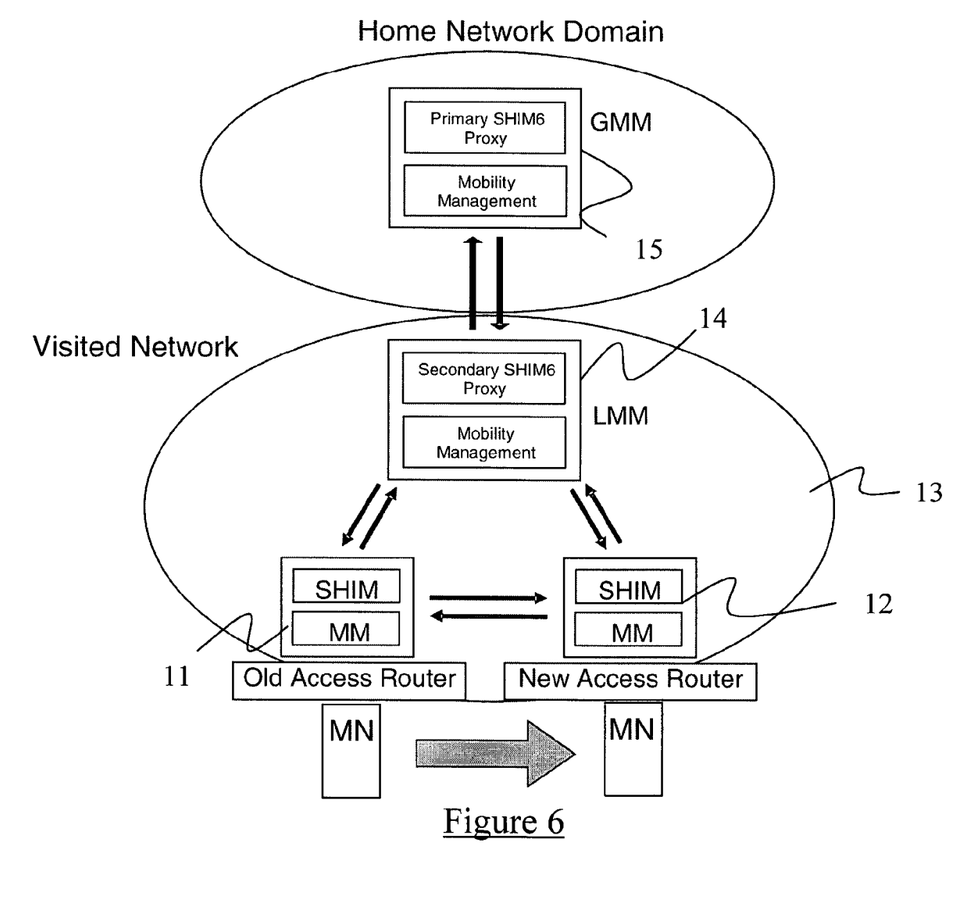
FIG. 6 illustrates schematically a handover between two Access Routers both acting as secondary SHIM6 proxies.

The proposed schemes in the invention can also be applied to a hierarchical Proxy Mobile IPv6 network. FIG. 6 illustrates a scenario in which a mobile node moves between Access Routers 11,12 within the same local domain 13. In this example, it is assumed that the Access Routers implement a LMM protocol (e.g. Proxy Mobile IPv6) and thus accommodate a Secondary SHIM6 Proxy. The context transfer mechanism of any one of the above three approaches may be employed to transfer a SHIM6 context between the old and the new Access Router, with the context being updated according to the availability of the IP addresses (locators) for the mobile node. It will be appreciated however that it is the Secondary proxy within the LMM anchor 14 (rather than the Primary proxy) that coordinates the context transfer. The updated SHIM6 context is then reported by the Secondary context in the LMM anchor to the Primary proxy in the GMM anchor 15.

Figure 7:
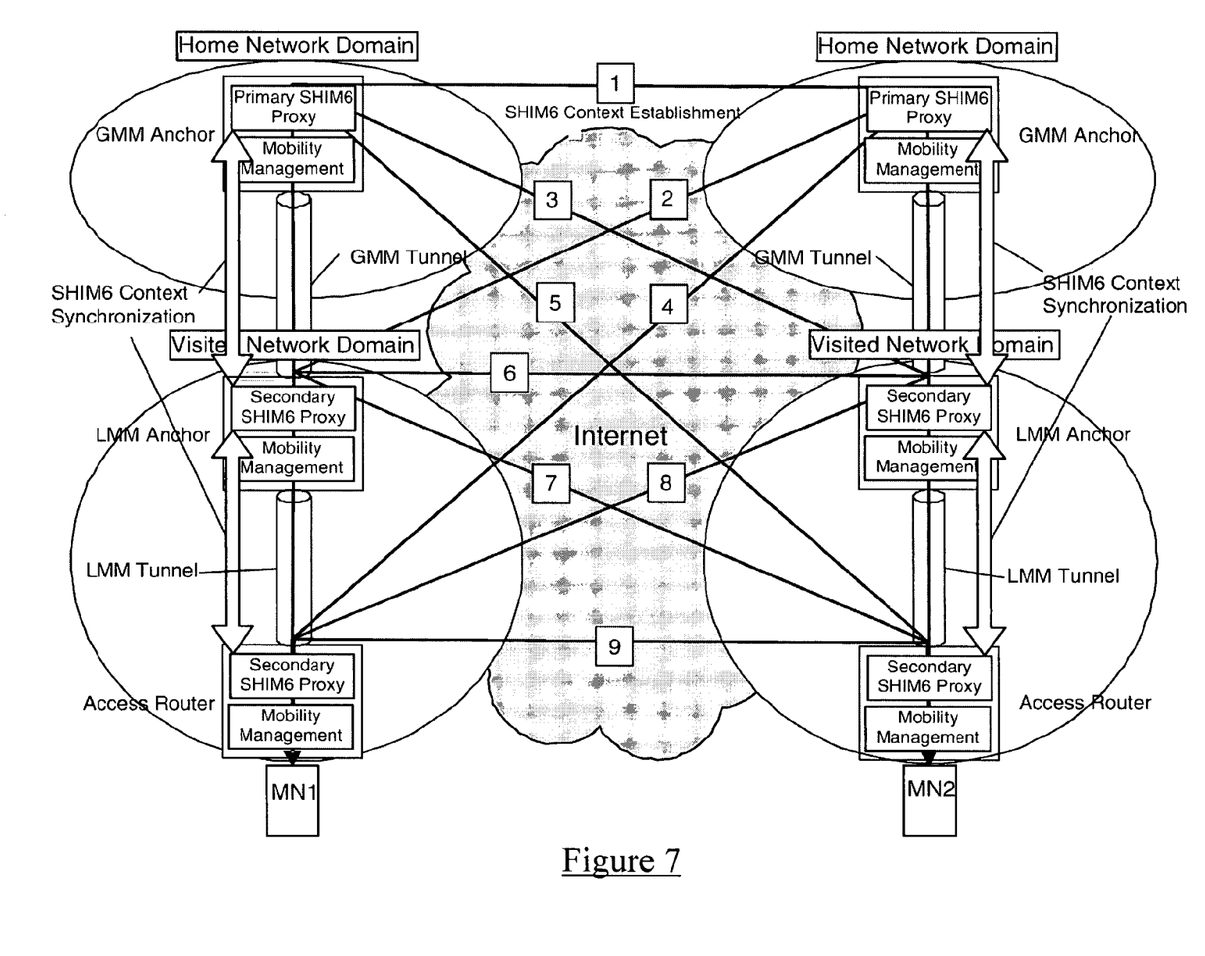
FIG. 7 illustrates possible routing scenarios within a network supporting a hierarchical SHIM6 proxy group.

FIG. 7 further illustrates this hierarchical Proxy Mobile IPv6 network scenario and possible routing paths between a pair of mobile nodes. In this example, it is assumed that the Proxy Mobile IPv6 is used as both the GMM and the LMM protocol. The GMM Anchor implements Local Mobility Anchor (LMA) functionality and accepts binding registration from the LMM Anchor which plays the role of a Proxy Mobility Agent (PMA). The LMM at the same time serves as a LMA, i.e., it accepts binding registration from the AR which plays the role of a Proxy Mobile Agent (PMA).

A SHIM6 Proxy Group is formulated for each mobile node as shown in the Figure. The GMM Anchor in the home network domain accommodates the Primary SHIM6 Proxy. The LMM Anchor and the AR serving the mobile node each accommodate a Secondary SHIM6 proxy. The locator which is handled by the AR can be the IP address assigned to the interface of the AR. Locator switching can be done in the AR, since it is topologically closest to the mobile node. As shown, thanks to the SHIM6 Proxy Group, various routing paths are possible between the communicating mobile nodes.

It will be appreciated by the person of skill in the art that various modifications may be made to the above described embodiment without departing from the scope of the present invention.

The invention claimed is:

1. A method of facilitating multihoming in the case of a mobile node possessing an Upper Layer Identifier belonging to a home network, where the mobile node is assigned a Global Mobility Management anchor within the home network and a Local Mobility Management anchor within a visited network, the method comprising the steps of:

allocating to the mobile node, a primary Shim for IPv6 (SHIM6) proxy at said Global Mobility Management anchor, and at least one secondary SHIM6 proxy at said Local Mobility Management anchor;

enabling only the primary SHIM6 proxy to perform the following:
    establishing a SHIM6 context on behalf of the mobile node in respect of a peer node, and
    locator updating;

using the primary SHIM6 proxy, sharing the established context with said secondary SHIM6 proxy; and performing locator switching with respect to traffic exchanged between the mobile node and said peer node at one of said primary and secondary SHIM6 proxies.

2. The method according to claim 1, wherein said home network is a Home Public Land Mobile Network and said visited network is a Visited Pubic Land Mobile Network.

3. The method according to claim 2, wherein said Global Mobility Management anchor and said Local Mobility Management anchor are packet data network gateways.

4. The method according to claim 1, and comprising performing locator switching at said secondary SHIM6 proxy.

5. The method according to claim 1, further comprising performing said step of sharing the established context using an extension to the SHIM6 protocol.

6. The method according to claim 1, further comprising performing said step of sharing the established context using a mobility management protocol used between the Global Mobility Management anchor and the Local Mobility Management anchor to handle mobility of the mobile node.

7. The method according to claim 1, further comprising, in the event that the mobile node changes to a new Local Mobility Management anchor while a session between said mobile node and sad peer node is ongoing, the step of installing an updated SHIM6 context for the session into the new Local Mobility Management anchor.

8. The method according to claim 7, further comprising transferring the context directly from the old to the new Local Mobility Management anchor.

9. The method according to claim 7, further comprising transferring the context from the Global Mobility Management Anchor to the new Local Mobility Management anchor.

10. The method according to claim 1, further comprising the steps of:

allocating to the mobile node, a further secondary SHIM6 proxy within an Access Router used by the mobile node to access the visited network; and sharing said context with the further secondary SHIM6 proxy.

11. The method according to claim 10, further comprising performing locator switching at said further secondary SHIM6 proxy.

12. The method according to claim 10, further comprising, in the event that the mobile node changes to a new Access Router while a session between said mobile node and said peer node is ongoing, the step of installing an updated SHIM6 context for the session into the new Access Router.

13. The method according to claim 12, further comprising transferring the context directly from the old to the new Access Router.

14. The method according to claim 12, further comprising transferring the context from said Local Mobility Management anchor to said new Access Router.

15. The method according to claim 10, further comprising performing said step of sharing the established context with said further secondary SHIM6 proxy using an extension to the SHIM6 protocol.

16. The method according to claim 10, further comprising performing said step of sharing the established context with said further secondary SHIM6 proxy using a mobility management protocol used between the Local Mobility Management anchor and the Access Router.

17. The method according to claim 10, wherein said step of allocating the secondary SHIM6 proxy to the mobile node includes:
 discovering, at the allocated primary SHIM6 proxy, which Local Mobility Management anchors are capable of operating as secondary SHIM6 proxies; and
 constructing a proxy group containing secondary SHIM6 proxies at the capable Local Mobility Management anchors.

18. The method according to claim 17, wherein said step of discovering which Local Mobility Management anchors are capable of operating as secondary SHIM6 proxies includes examining a flag of binding update messages received at the Global Mobility Management anchor from Local Mobility Management anchors.

* * * * *

UNITED STATES PATENT AND TRADEMARK OFFICE
CERTIFICATE OF CORRECTION

PATENT NO. : 8,437,309 B2
APPLICATION NO. : 12/739832
DATED : May 7, 2013
INVENTOR(S) : Sugimoto et al.

It is certified that error appears in the above-identified patent and that said Letters Patent is hereby corrected as shown below:

In the Claims

In Column 8, Line 17, in Claim 2, delete "Pubic" and insert -- Public --, therefor.

In Column 8, Line 21, in Claim 4, delete "and comprising" and insert -- further comprising --, therefor.

In Column 8, Line 34, in Claim 7, delete "sad" and insert -- said --, therefor.

Signed and Sealed this
First Day of October, 2013

Teresa Stanek Rea
*Deputy Director of the United States Patent and Trademark Office*